(12) United States Patent
Huang et al.

(10) Patent No.: US 11,810,002 B2
(45) Date of Patent: Nov. 7, 2023

(54) DYNAMIC PREDICTION MODEL ESTABLISHMENT METHOD, ELECTRIC DEVICE, AND USER INTERFACE

(71) Applicant: INDUSTRIAL TECHNOLOGY RESEARCH INSTITUTE, Hsinchu (TW)

(72) Inventors: Po-Yu Huang, Tainan (TW); Sen-Chia Chang, Hsinchu (TW); Te-Ming Chen, Taipei (TW); Hong-Chi Ku, Xihu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1158 days.

(21) Appl. No.: 16/428,531

(22) Filed: May 31, 2019

(65) Prior Publication Data

US 2020/0184346 A1 Jun. 11, 2020

(30) Foreign Application Priority Data

Dec. 10, 2018 (TW) ................................. 107144359

(51) Int. Cl.
*G06N 5/02* (2023.01)
*G06N 20/00* (2019.01)

(52) U.S. Cl.
CPC .............. *G06N 5/02* (2013.01); *G06N 20/00* (2019.01)

(58) Field of Classification Search
CPC .................................. G06N 5/02; G06N 20/00
See application file for complete search history.

(56) References Cited

U.S. PATENT DOCUMENTS

| 4,858,147 A | 8/1989 | Conwell |
| 4,874,963 A | 10/1989 | Alspector |
| 4,943,931 A | 7/1990 | Allen |
| 5,004,932 A | 4/1991 | Nejime |
| 5,016,204 A | 5/1991 | Simoudis et al. |

(Continued)

FOREIGN PATENT DOCUMENTS

| CN | 106127366 A | 11/2016 |
| CN | 108021985 A | 5/2018 |

(Continued)

OTHER PUBLICATIONS

Chuang, Yao-Chen, et al. "Transfer learning for efficient meta-modeling of process simulations." Chemical Engineering Research and Design 138 (2018): 546-553. (Year: 2018).*

(Continued)

*Primary Examiner* — Kevin W Figueroa
(74) *Attorney, Agent, or Firm* — Birch, Stewart, Kolasch & Birch, LLP

(57) ABSTRACT

A dynamic prediction model establishment method, an electric device and a user interface are provided. The dynamic prediction model establishment method includes the following steps. An integration model is established by a processing device according to at least one auxiliary data set. The integration model is modified as a dynamic prediction model by the processing device according to a target data set. A sampling point recommendation information is provided by the processing device according to an error degree or an uncertainty degree between the at least one auxiliary data set and the target data set.

17 Claims, 8 Drawing Sheets

(56) References Cited

U.S. PATENT DOCUMENTS

| | | | |
|---|---|---|---|
| 5,056,037 | A | 10/1991 | Eberhardt |
| 5,063,492 | A | 11/1991 | Yoda et al. |
| 5,142,612 | A | 8/1992 | Skeirik |
| 5,161,110 | A | 11/1992 | Dorchak |
| 5,349,541 | A | 9/1994 | Alexandro, Jr. et al. |
| 5,418,710 | A | 5/1995 | Ono et al. |
| 7,904,397 | B2 | 3/2011 | Fan et al. |
| 8,363,819 | B2 | 1/2013 | Zgardovski et al. |
| 8,412,563 | B2 | 4/2013 | Taintor et al. |
| 8,473,415 | B2 | 6/2013 | Siegel et al. |
| 8,738,549 | B2 | 5/2014 | Lingenfelder et al. |
| 9,256,838 | B2 | 2/2016 | Sow et al. |
| 2008/0154664 | A1 | 6/2008 | Kuo et al. |
| 2014/0114840 | A1 | 4/2014 | Arnold et al. |
| 2017/0193400 | A1 | 7/2017 | Bhaskar et al. |
| 2018/0121814 | A1* | 5/2018 | Yu .................... G06N 3/04 |
| 2019/0087685 | A1* | 3/2019 | Wu .................... G06K 9/6269 |

FOREIGN PATENT DOCUMENTS

| | | |
|---|---|---|
| EP | 0 432 267 A1 | 6/1991 |
| JP | H3-14002 A | 1/1991 |
| JP | 2015-95219 A | 5/2015 |
| KR | 10-1492733 B1 | 2/2015 |
| KR | 10-1828503 B1 | 3/2018 |
| TW | 200745952 A | 12/2007 |
| TW | I509550 B | 11/2015 |
| TW | I539298 B | 6/2016 |
| WO | WO 2007/038713 A3 | 4/2007 |

OTHER PUBLICATIONS

Vehtari, Aki, Andrew Gelman, and Jonah Gabry. "Practical Bayesian model evaluation using leave-one-out cross-validation and WAIC." Statistics and computing 27.5 (2017): 1413-1432. (Year: 2017).*

Taiwanese Notice of Allowance and Search Report for Taiwanese Application No. 107144359, dated May 31, 2021.

Author Unknown "Transfer learning.", Wikipedia, 2 Pages.

Currin et al. "A Bayesian Approach to the Design and Analysis of Computer Experiments.", Source Unknown, Sep. 1, 1988, 1 Page.

Golovin et al. "Google Vizier: A Service for Black-Box Optimization.", Google Research, Pittsburgh, PA, USA, 10 Pages, (2017).

Morris et al. "Bayesian Design and Analysis of Computer Experiments: Use of Derivatives in Surface Prediction.", Technometrics, 35(3), 15 Pages (1993).

Pan et al. "A Survey on Transfer Learning.", IEEE, 15 Pages (2009).

Park "Turning complex computer codes to data and optimal designs.", Thesis (Ph.D.) University of Illinois at Urbana-Champaign, 1 Page (1991).

Rahnamayan et al. "A novel population initialization method for accelerating evolutionary algorithms.", Computers and Mathematics With Applications, 53, 1605-1614 (2007).

Xiong et al. "Sequential Design and Analysis of High-Accuracy and Low-Accuracy Computer Codes.", Technometrics, 55(1), 1 Page (2013).

Zhou et al. "A sequential multi-fidelity metamodeling approach for data regression.", Knowledge-Based Systems, 134, 199-212 (2017).

* cited by examiner

DYNAMIC PREDICTION MODEL ESTABLISHMENT METHOD, ELECTRIC DEVICE, AND USER INTERFACE

This application claims the benefit of Taiwan application Serial No. 107144359, filed Dec. 10, 2018, the disclosure of which is incorporated by reference herein in its entirety.

TECHNICAL FIELD

The disclosure relates in general to a dynamic prediction model establishment method, an electric device and a user interface.

BACKGROUND

In various production fields of products, a prediction model is often used to predict process results. The prediction model could be established through the target data. Although the target data has high reality, it takes a large amount of cost to implement the target data. Obtaining the target data with large data volume is unavailable, so a prediction model with high accuracy cannot be established (that is, a prediction model with small bias and high uncertainty).

Alternatively, the prediction model could be established using a large amount of auxiliary data. For example, the auxiliary data could be obtained through the simulation of a simulator established according to the theories of physics or chemistry or could be obtained through the estimation of the historical data of similar products. The acquisition of auxiliary data takes low cost. However, the simulator cannot simulate the realities to 100%, and has the problem of incompleteness. Furthermore, there are differences between similar products and the target product. Therefore, the prediction result still has a certain degree of error (that is, the prediction model has large bias and low uncertainty).

Therefore, it has become a prominent task for the research personnel to provide a prediction model with lower cost and higher prediction accuracy to meet the requirements of the industries.

SUMMARY

The disclosure is directed to a dynamic prediction model establishment method, an electric device and a user interface.

According to one embodiment, a dynamic prediction model establishment method is provided. The dynamic prediction model establishment method includes the following steps. An integration model is established by a processing device according to at least one auxiliary data set. The integration model is modified as a dynamic prediction model by the processing device according to a target data set. A sampling point recommendation information is provided by the processing device according to an error degree or an uncertainty degree between the at least one auxiliary data set and the target data set.

According to another embodiment, an electric device is provided. The electric device includes a processing device configured to perform a dynamic prediction model establishment method. The dynamic prediction model establishment method includes the following steps. An integration model is established by a processing device according to at least one auxiliary data set. The integration model is modified as a dynamic prediction model by the processing device according to a target data set. A sampling point recommendation information is provided by the processing device according to an error degree or an uncertainty degree between the at least one auxiliary data set and the target data set.

According to an alternative embodiment, a user interface is provided. The user interface is configured to display at least one auxiliary data set and a target data set, and an error degree and an uncertainty degree of a dynamic prediction model.

The above and other aspects of the disclosure will become better understood with regard to the following detailed description of the preferred but non-limiting embodiment(s). The following description is made with reference to the accompanying drawings.

Figure 1:
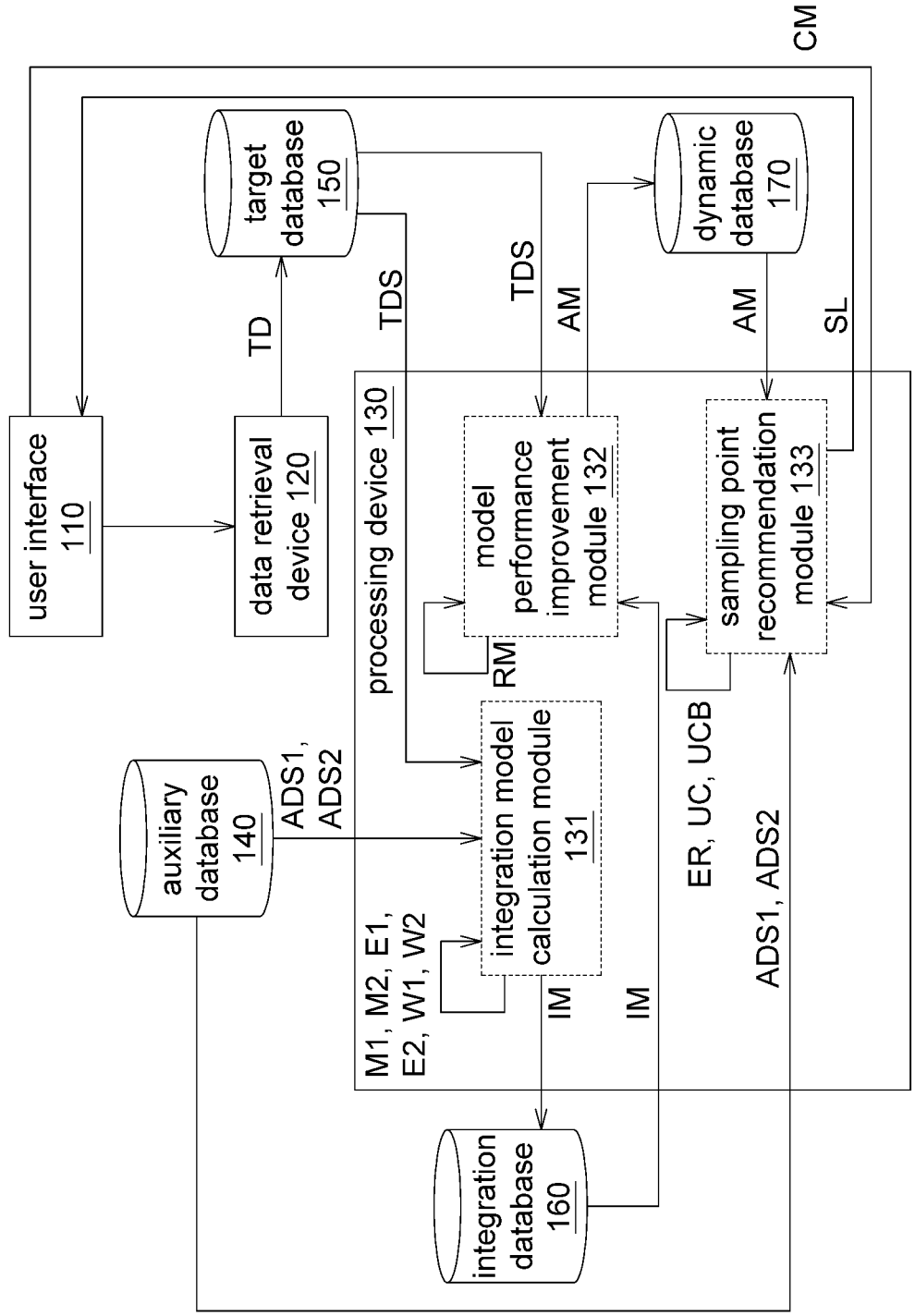
FIG. 1 is a schematic diagram of an electric device according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In various production fields of products, a prediction model is often used to predict process results. The prediction model could be established through the target data. Although the target data has high reality, it takes a large amount of cost to implement the target data. Obtaining the target data with large data volume is unavailable. The prediction model with small target data volume will have high uncertainty degree.

Alternatively, a prediction model could be established using a large amount of auxiliary ata. For example, the auxiliary data could be obtained through the simulation of a simulator established according to the theories of physics or chemistry or could be obtained through the estimation of the historical data of similar products. The acquisition of auxiliary data takes low cost. However, the simulator cannot simulate the realities to 100%, and has the problem of incompleteness. Furthermore, there are differences between similar products and the target product. Therefore, the prediction model established by the auxiliary data has a large error degree.

In this disclosure, various embodiments of a dynamic prediction model establishment method are disclosed below. The dynamic prediction model establishment method combines at least one auxiliary data set and a target data set via a two-stage model stacking technology and provides suitable sampling strategies, such that both of the error degree and the uncertainty degree can be reduced. More specifically, the auxiliary data set includes at least one input parameter IT received by a target system 300 and at least one output response OT generated by the target system 300. Namely, both of the input parameter IT and the output response OT are disclosed in detail as below.

Referring to FIG. 1, a schematic diagram of an electric device 100 according to an embodiment is shown. The electric device 100 includes a user interface 110, a data retrieval device 120, a processing device 130, an auxiliary database 140, a target database 150, an integration database 160 and a dynamic database 170. The user interface 110 could be realized by a computer, a PC tablet, a touch screen, a mobile phone, or a frame on a screen, and the present disclosure is not limited thereto. The data retrieval device 120 could be realized by a sensor, a measurer, a data receiver, or a data input device, and the present disclosure is not limited thereto. The processing device 130 could be realized by a processing wafer, a circuit board, a circuit, a computer, a cloud computing center, or a mobile device, and the present disclosure is not limited thereto. The processing device 130 is configured to perform an integration model calculation module 131, a model performance improvement module 132 and a sampling point recommendation module 133. The integration model calculation module 131, the model performance improvement module 132 and the sampling point recommendation module 133 could be realized by program modules, firmware modules, or circuit modules, and the present disclosure is not limited thereto. The processing device 130 performs the integration model calculation module 131, the model performance improvement module 132 and the sampling point recommendation module 133 to implement the dynamic prediction model establishment method. The auxiliary database 140, the target database 150, the integration database 160 and the dynamic database 170 could be realized by a memory, a hard drive, or a cloud storage center, and the present disclosure is not limited thereto. The electric device 100 could combine at least one auxiliary data set and the target data set via the two-stage model stacking technology and implement various sampling strategies to reduce both of the error degree and the uncertainty degree. The operations of each of the above elements are disclosed below with an accompanying flowchart.

Figure 2:
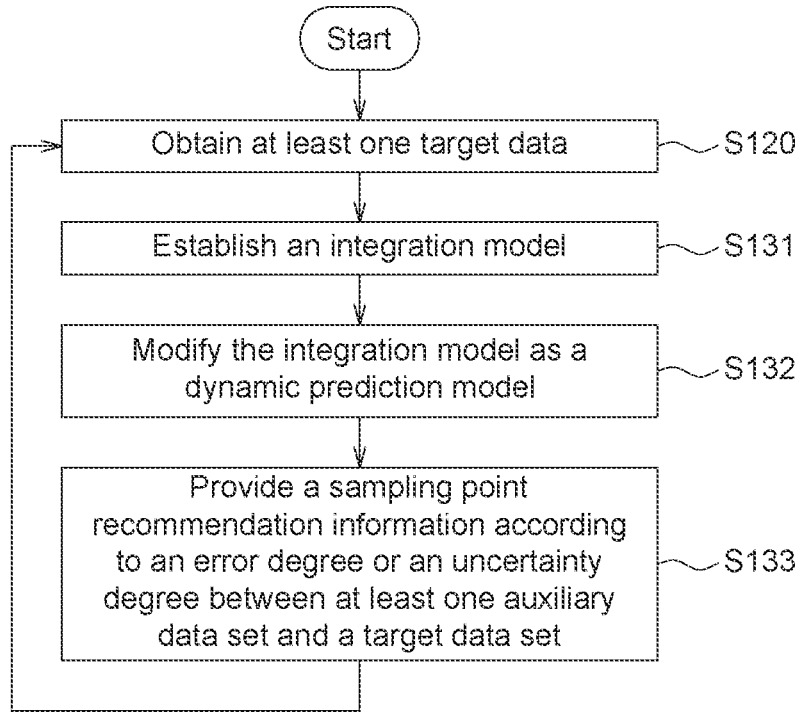
FIG. 2 is a flowchart of a dynamic prediction model establishment method according to an embodiment.
Figure 3:
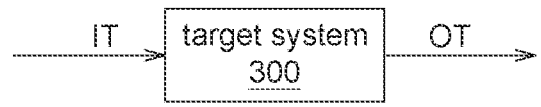
FIG. 3 is a schematic diagram of step S120.

Refer to FIGS. 2 to 3. FIG. 2 is a flowchart of a dynamic prediction model establishment method according to an embodiment. In step S120, at least one target data TD is obtained by the data retrieval device 120. Referring to FIG. 3, a schematic diagram of step S120 is shown. In the step S120, at least one input parameter IT and at least one output response OT of a target system 300 (or a target process or a target machinery, and the present disclosure is not limited thereto) are obtained by the data retrieval device 120. The data retrieval device 120 could obtain an input parameter IT and an output response OT of the target system 300 (or the target process or the target machinery) by reading files, employing a data retrieval interface or accessing a database system. The output response OT could be discrete values (categorical data), such as the go gauge (GO) and no-go gauge (No-GO) of product quality control or a recommended preference ranking, and the present disclosure is not limited thereto.

Refer to Table 1. Table 1 illustrates examples of the input parameter IT and the output response OT of the target system 300.

TABLE 1

| Input Parameter IT | Output Response OT |
|---|---|
| −10.00 | 12.08 |
| −7.50 | 3.13 |
| −5.00 | 14.50 |

Let an MOCVD process be taken for example. When the model or the brand changes, the present disclosure could fully utilize the original information of the MOCVD process. The input parameter IT could be sensing information such as the pressure or temperature of the MOCVD process, and the present disclosure is not limited thereto. The output response OT could be the health status of the MOCVD process, and the present disclosure is not limited thereto.

Let an LED process be taken for example. When product specifications change (for example, the wavelength requirement is adjusted), the prediction performance of the prediction model could be increased with the assistance of the original product information. The input parameter IT could be the flow of various gases required in the LED process, and the present disclosure is not limited thereto. The output response OT could be product quality (such as the film thickness, the magnitude of stress, and so on), and the present disclosure is not limited thereto.

Let a hyperparameter auto-tuning software system be taken for example. When a hyperparameter auto-tuning process is performed to a complicated model, excellent pre-emptive information could be provided to the auto-tuning system according to the results of an adjusted model or a simple strategy. The input parameter IT could be the hyperparameter of the hyperparameter auto-tuning software system, and the present disclosure is not limited thereto. The output response OT could be the prediction accuracy of the hyperparameter auto-tuning software system, and the present disclosure is not limited thereto.

The target data TD is stored in target database 150 to form a target data set TDS.

Then, the method proceeds to step S131, an integration model IM is established by the integration model calculation module 131 according to at least one auxiliary data set. In the descriptions below, two auxiliary data sets ADS1 and ADS2 are used as an exemplification. However, the amount of auxiliary data sets is not limited in the present disclosure.

Figure 4:
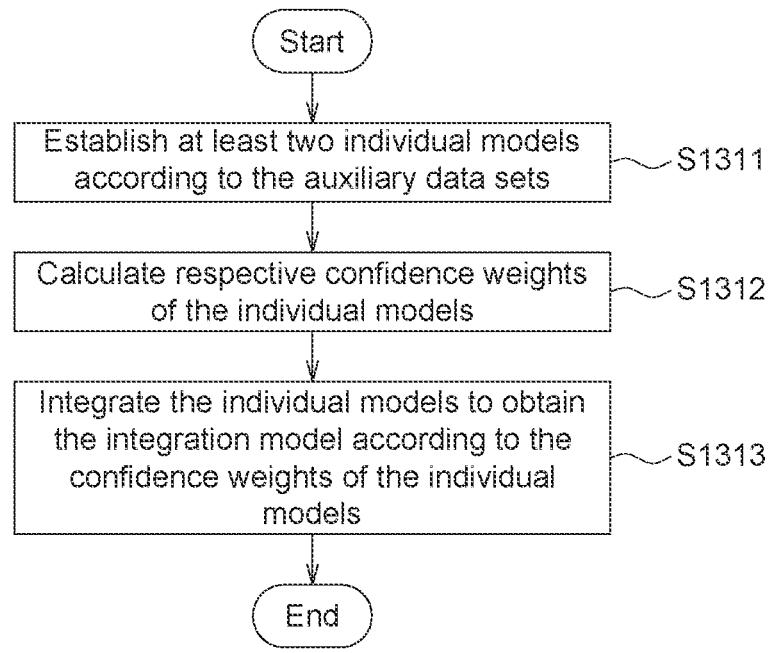
FIG. 4 is a detailed flowchart of step S131.
Figure 5:
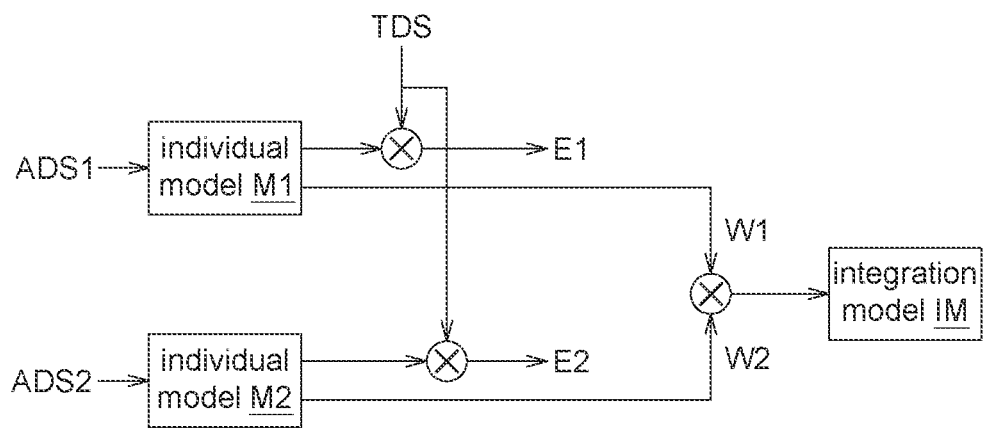
FIG. 5 is a schematic diagram of step S131.

Refer to FIGS. 4 to 5. FIG. 4 is a detailed flowchart of step S131. FIG. 5 is a schematic diagram of step S131. Step S131 includes sub-steps S1311 to S1313. In sub-step S1311, at least two individual models M1 and M2 are established by the integration model calculation module 131 according to at least two auxiliary data sets ADS1 and ADS2.

The auxiliary data sets ADS1 and ADS2 could be simulation data sets provided by a simulation software or approximate data sets provided by similar machinery (similar processes, similar systems or historical products), and the present disclosure is not limited thereto. The auxiliary data sets ADS1 and ADS2 include an input parameter IT and an output response OT.

Let an LED process be taken for example. When developing a new product, the simulation data obtained by a physical simulator or a chemical simulator (such as the CVDSim of the STR Group) could provide sufficient information to the model.

Refer to Table 2. Table 2 illustrate examples of the auxiliary data set ADS1.

TABLE 2

| Input Parameter IT | Output Response OT |
|---|---|
| −9.93 | 8.83 |
| −7.87 | 2.35 |
| −7.50 | 4.45 |

Refer to Table 3. Table 3 illustrate examples of the auxiliary data set ADS2.

TABLE 3

| Input Parameter IT | Output Response OT |
|---|---|
| −8.35 | 1.82 |
| −6.79 | 6.02 |
| −9.22 | 7.17 |

In sub-step S1311, a suitable model could be selected for each of the auxiliary data sets ADS1 and ADS2 according to respective data features of the auxiliary data sets ADS1 and ADS2. For example, the random forest (RF) model, the Gaussian process (GP) model and the logistic regression (LR) model could be used as candidate models, and a suitable model could be selected according to a mean absolute error (MAE) score in a leave-one-out verification method, and the present disclosure is not limited thereto.

Then, the method proceeds to sub-step S1312, respective confidence weights W1 and W2 of the individual models M1 and M2 are calculated by the integration model calculation module 131. As indicated in Table 4, in response to the input parameter IT (that is, −10.0, −7.50, −5.00) inputted to the individual model M1, the target system 300 outputs a predicted output response OT (that is, 6.58, 4.15, 4.15). A mean absolute error E1 (that is, 6.17) is calculated according to the predicted output response OT (that is, 6.58, 4.15, 4.15) and the output response OT (that is, 12.08, 3.13, 14.50) of the target system 300. Since the auxiliary data sets ADS1 and ADS2 are provided by the simulation software or similar systems or products and the target data set TDS is provided by the target system 300, there are errors existing between the auxiliary data sets ADS1 and ADS2 and the target data set TDS. The smaller the errors are, the better the auxiliary data sets ADS1 and ADS2 represent the target data set TDS.

Refer to Table 4. In response to the input parameter IT (that is, −10.0, −7.50, −5.00) inputted to the individual model M2, the target system 300 outputs a predicted output response OT (that is, 6.13, 5.34, 5.34). A mean absolute error E2 (that is, 5.95) is calculated according to the predicted output response OT (that is, 6.13, 5.34, 5.34) and the output response OT (that is, 12.08, 3.13, 14.50).

TABLE 4

| Input parameter IT of the target system 300 | Output response OT of the target system 300 | Predicted output response OT of the individual model M1 | Predicted output response of the individual model M2 |
|---|---|---|---|
| −10.0 | 12.08 | 6.58 | 6.13 |
| −7.50 | 3.13 | 4.15 | 5.34 |
| −5.00 | 14.50 | 4.15 | 4.34 |

TABLE 4-continued

| Input parameter IT of the target system 300 | Output response OT of the target system 300 | Predicted output response OT of the individual model M1 | Predicted output response of the individual model M2 |
|---|---|---|---|
| Mean absolute errors E1 and E2 | | 6.17 | 5.95 |

Refer to equations (1) and (2). The confidence weights W1 and W2 could be calculated according to the mean absolute errors E1 and E2 of the individual models M1 and M2. The confidence weights W1 and W2 are negatively correlated with respective mean absolute errors E1 and E2 of the individual models M1 and M2.

$$W1 = \frac{E2}{E1 + E2} \quad (1)$$

$$W2 = \frac{E1}{E1 + E2} \quad (2)$$

Then, the method proceeds to sub-step S1313, the individual models M1 and M2 are integrated to obtain the integration model IM by the integration model calculation module 131 according to the confidence weights W1 and W2 of the individual models M1 and M2.

Through sub-steps S1311 to S131, the integration model IM could be obtained according to the auxiliary data sets ADS1 and ADS2. The integration model IM integrates the simulation data provided by a simulator or the historical data of similar products, and therefore could provide better prediction result.

Then, the method proceeds to step S132 of FIG. 2, the integration model IM is modified as a dynamic prediction model AM by the model performance improvement module 132 according to the target data set TDS. In step S132, the accuracy of the dynamic prediction model AM is increased by the model performance improvement module 132 through transfer learning according to the integration model IM and the target data set TDS.

Figure 6:
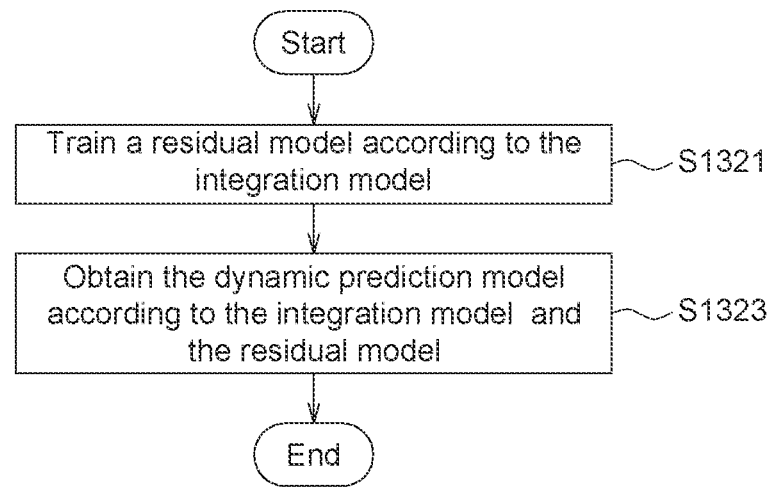
FIG. 6 is a detailed flowchart of step S132.
Figure 7:
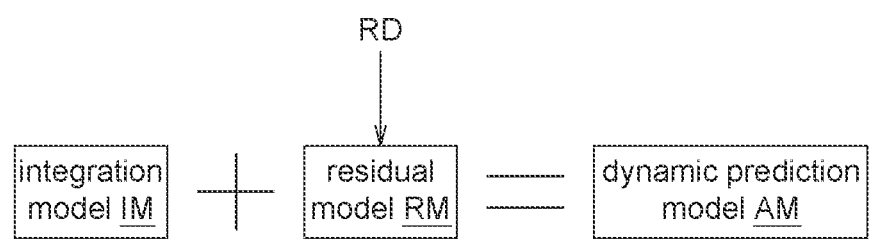
FIG. 7 is a schematic diagram of step S132.

Refer to FIGS. 6 to 7. FIG. 6 is a detailed flowchart of step S132. FIG. 7 is a schematic diagram of step S132. Step S132 includes sub-steps S1321 and S1322. In sub-step S1321, a residual model RM is trained by the model performance improvement module 132 according to the integration model IM. In the present disclosure, the target system effect is decomposed as auxiliary system effect and transferring effect, wherein the auxiliary system effect is described using the integration model IM, and the transferring effect is described using the residual model RM. Refer to Table 5. Table 5 illustrates examples of the residual value RD of the integration model IM.

TABLE 5

| Input parameter IT of the target system 300 | Output response OT of the target system 300 | Predicted output response OT of the integration model IM | Residual value RD |
|---|---|---|---|
| −10.0 | 12.08 | 6.35 | 5.73 |
| −7.50 | 3.13 | 4.75 | −1.63 |
| −5.00 | 14.50 | 4.75 | 9.74 |

A residual model RM could be trained according to the input parameter IT and the residual value RD of the target system 300. In step S1321, the random forest (RF) model, the Gaussian process (GP) model and the logistic regression (LR) model could be used as candidate models, and a suitable residual model RM could be selected by the model performance improvement module 132 according to the MAE score of the LOO verification method.

Then, the method proceeds to step S1322, the integration model IM and the residual model RM are combined by the model performance improvement module 132 to obtain the dynamic prediction model AM.

Through sub-steps S1321 to S1322, the integration model IM obtained from the auxiliary data sets ADS1 and ADS2 is modified as the dynamic prediction model AM according to the target data set TDS. After the residual model RM is trained using the two-stage model stacking technology adopted in the present disclosure, the residual model RM is further combined with the integration model IM, such that the dynamic prediction model AM, having combined the integration model IM and the target data set TDS, could provide better prediction results.

Then, the method proceeds to step S133 of FIG. 2, a sampling point recommendation information SL is provided by the sampling point recommendation module 133 according to an error degree ER or an uncertainty degree UC between the auxiliary data sets ADS1 and ADS2 and the target data set TDS. The error degree ER is the difference between the auxiliary data sets ADS1, ADS2 and the target data set TDS. The uncertainty degree UC is the confidence of the auxiliary data sets ADS1, ADS2. The sampling point recommendation module 133 could provide different sampling strategies by which the effect of each sampling point could be maximized. The sampling strategies are used to reduce both of the error degree ER and the uncertainty degree UC.

Figure 8:
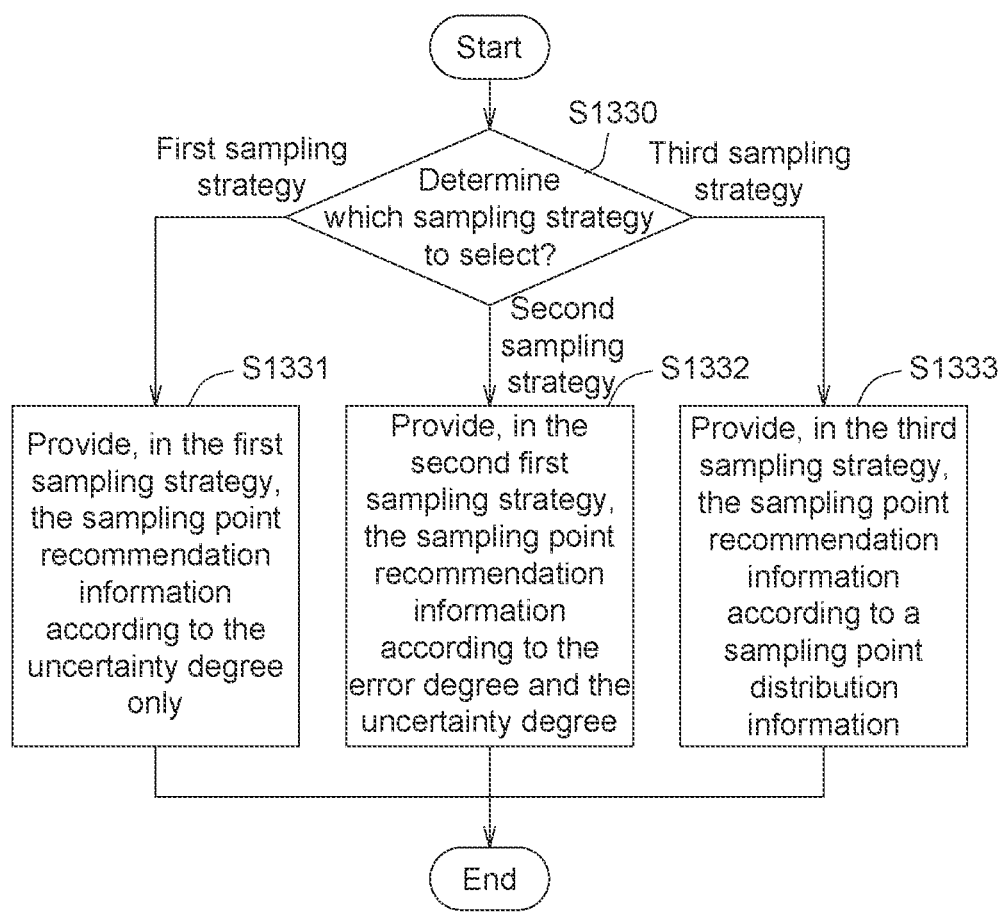
FIG. 8 is a detailed flowchart of step S133.
Figure 9:
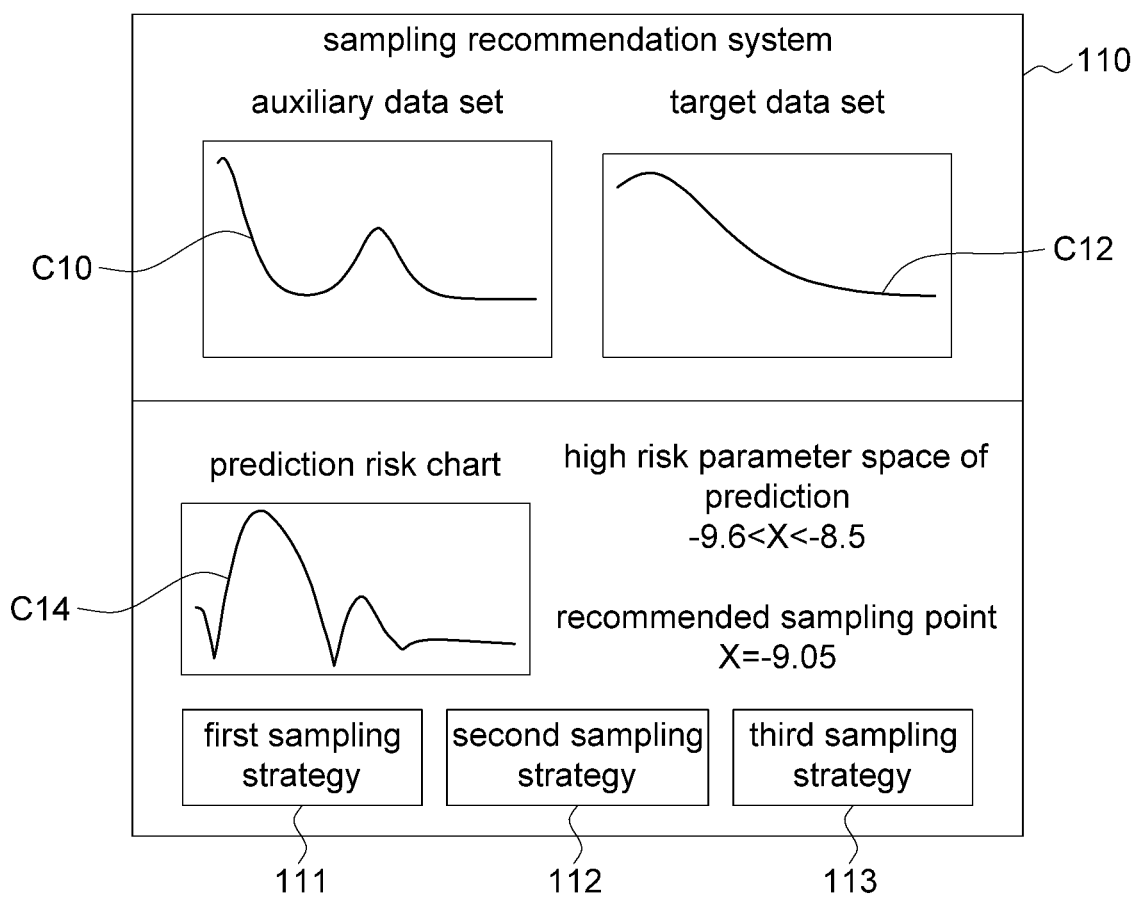
FIG. 9 is a schematic diagram of a user interface according to an embodiment.

Referring to FIG. 8, a detailed flowchart of step S133 is shown. Step S133 includes sub-steps S1330 to S1323. In sub-step S1330, which sampling strategy to select is determined. If the first sampling strategy is selected, then the method proceeds to sub-step S1331. If the second sampling strategy is selected, then the method proceeds to sub-step S1332. If the third sampling strategy is selected, then the method proceeds to sub-step S1333. Referring to FIG. 9, a schematic diagram of a user interface 110 according to an embodiment is shown. The user interface 110 could display multiple sampling strategy press-keys 111, 112, and 113. The user could click the sampling strategy press-key 111 and output the selection command CM to determine the selection of the first sampling strategy. The user could click the sampling strategy press-key 112 and output the selection command CM to determine that the selection of the second sampling strategy. The user could click the sampling strategy press-key 113 and output the selection command CM to determine the selection of the third sampling strategy.

Figure 10:
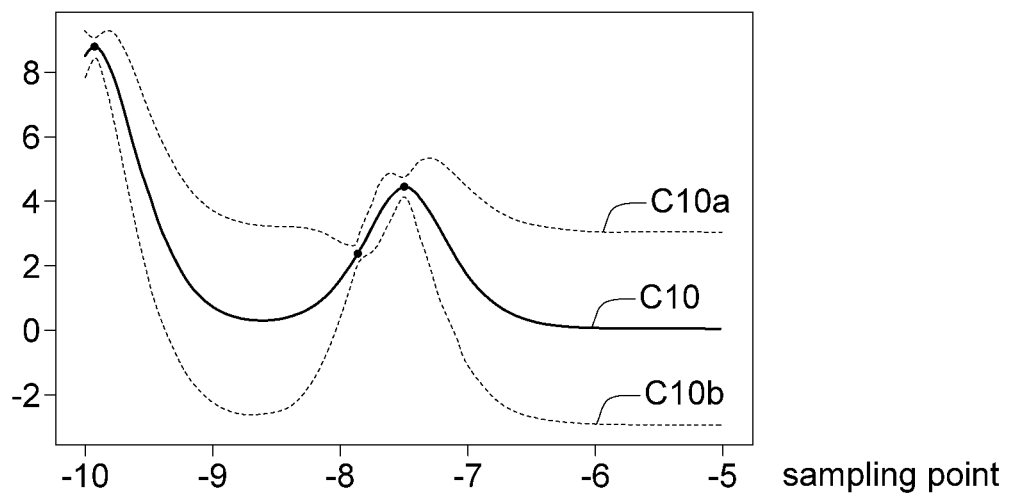
FIG. 10 is a distribution curve of the auxiliary data set.
Figure 11:
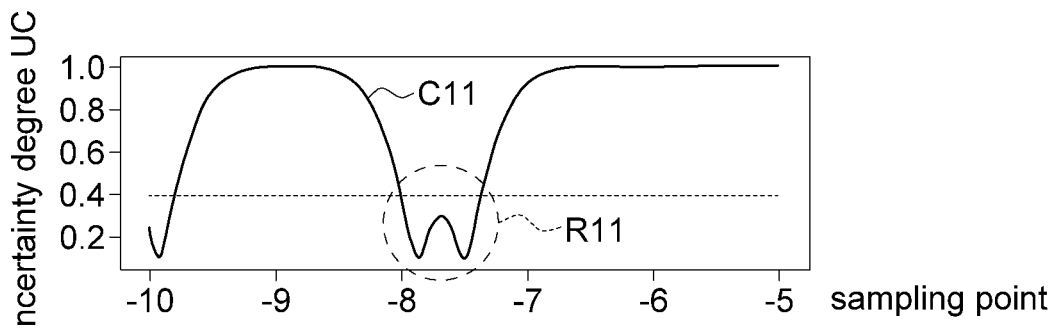
FIG. 11 is an uncertainty curve of uncertainty degree of the auxiliary data set.

In the first sampling strategy as indicated in sub-step S1331, a sampling point recommendation information SL is provided by the sampling point recommendation module 133 according to the uncertainty degree UC only. In an early stage of the establishment of the dynamic prediction model AM, the target data TD may not be available yet or may have only a tiny amount, so the first sampling strategy could be used. Referring to FIGS. 10 to 11. FIG. 10 is an auxiliary data set ADS1 distribution curve of C10. FIG. 11 is an uncertainty curve C11 of uncertainty degree UC of the auxiliary data set ADS1. The uncertainty degree UC is the difference between the uncertainty upper limit curve C10a and the uncertainty lower limit curve C10b of FIG. 10. In the first sampling strategy, the region R11 of the auxiliary data set ADS1 (or the auxiliary data set ADS2) with a lower uncertainty degree UC (that is, high density region) could be selected, such that the auxiliary data set ADS1 (or the auxiliary data set ADS2) could be sufficiently linked to the target data set TDS.

Figure 12:
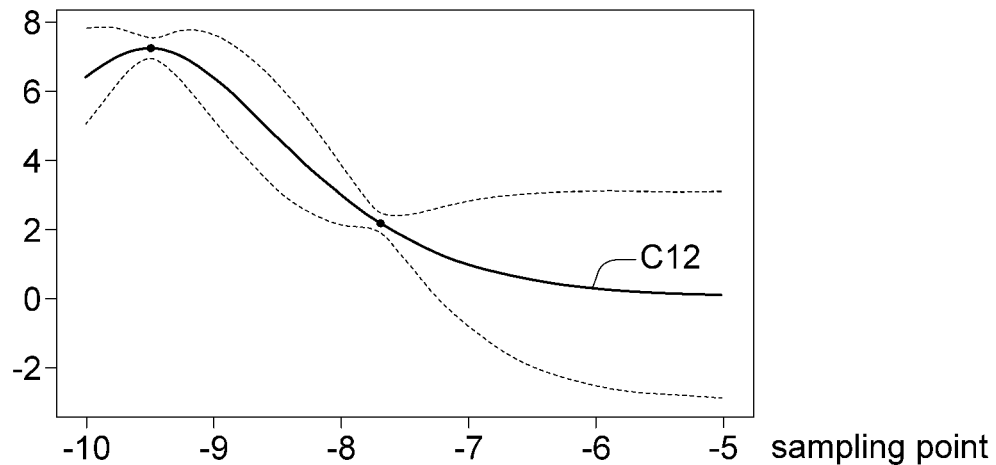
FIG. 12 is a distribution curve of the target data set.
Figure 13:
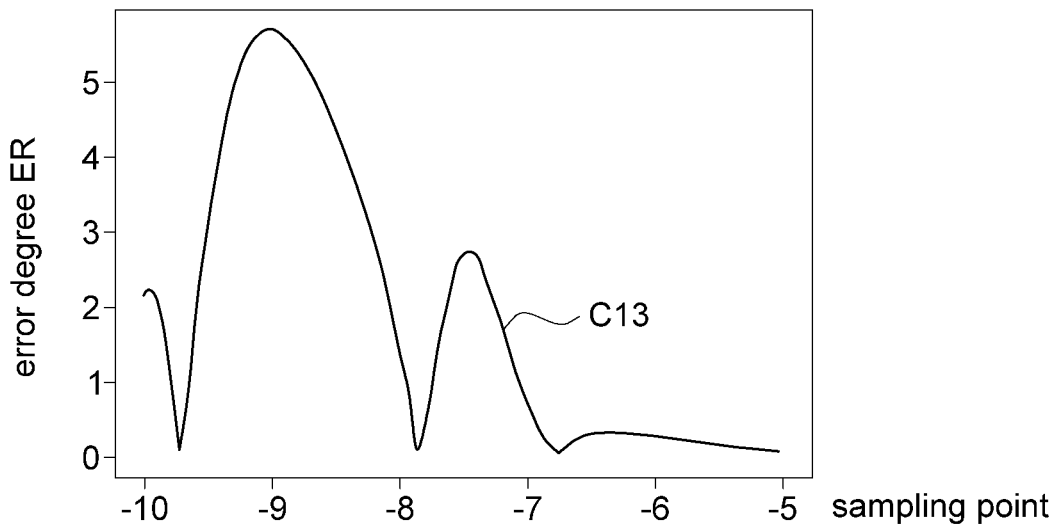
FIG. 13 is a curve of error degree.

In the second sampling strategy as indicated in sub-step S1332, a sampling point recommendation information SL is provided by the sampling point recommendation module 133 according to the error degree ER and the uncertainty degree UC. In a middle stage of the establishment of the dynamic prediction model AM, only a small amount of target data TD is available, so the second sampling strategy could be used. Refer to FIG. 12 and FIG. 13. FIG. 12 is a distribution curve C12 of the target data set TDS. FIG. 13 is an error curve C13 of error degree ER. The error degree ER is the difference between the distribution curve C10 of FIG. 10 and the distribution curve C12 of FIG. 12. As indicated in equation (3), the sampling score UCB (Upper Confidence Bound) could be calculated according to the error degree ER and the uncertainty degree UC.

$$UCB = \alpha * ER + \beta * UC \quad (3)$$

wherein, $\alpha$, $\beta$ are weighting coefficients.

Figure 14:
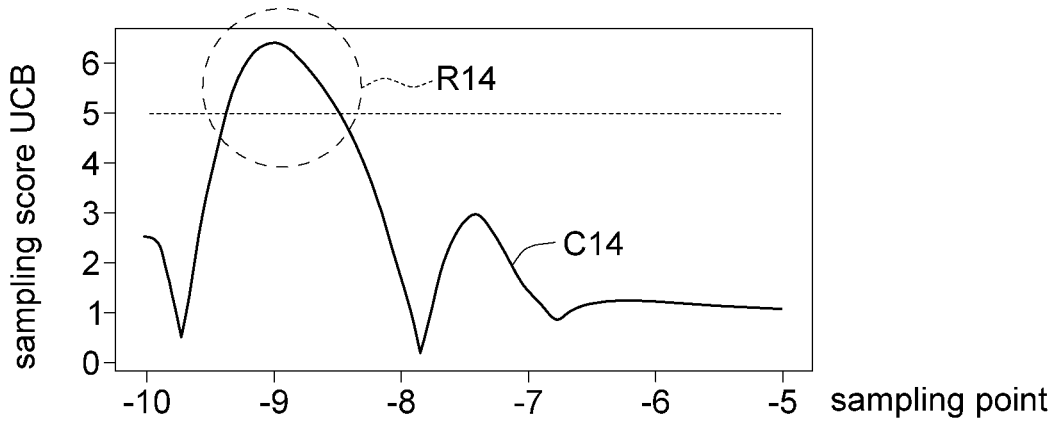
FIG. 14 is a score curve of sampling score.

Referring to FIG. 14, a score curve C14 of sampling score UCB is shown. In the second sampling strategy, the region R14 with lower sampling score UCB (that is, the region with high error degree ER and high uncertainty degree UC) could be selected, such that the region with lower accuracy could also be sample.

Figure 15:
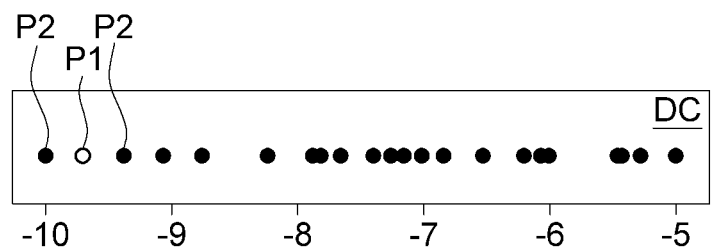
FIG. 15 is a schematic diagram of sampling point distribution information according to an embodiment.

In the third sampling strategy as indicated in sub-step S1333, a sampling point recommendation information SL is provided by the sampling point recommendation module 133 according to a sampling point distribution information DC. Referring to FIG. 15, a schematic diagram of the sampling point distribution information DC is sown. In a late stage of the establishment of the dynamic prediction model AM, a certain amount of target data TD has been collected, so the third sampling strategy could be used. Referring to FIG. 15, a sampling point distribution information DC according to an embodiment is shown. The sampling point recommendation module 133 could search a recommended sampling point P1, which has a largest distance to the neighboring sampling point P2 of an established model to assure that a maximum amount of information of the parameter space could be included.

According to the dynamic prediction model establishment method and the electric device 100 disclosed in above embodiments, the integration model IM is established according to the similarity information between the target data set TDS and the auxiliary data sets ADS1 and ADS2, wherein the similarity information is such as mean absolute errors E1 and E2, and the present disclosure is not limited thereto. The target data set TDS and the integration model IM are combined (the residual model RM) to obtain a dynamic prediction model AM with higher accuracy. Besides, under different sampling strategies, sampling regions with high prediction risk could be found according to the error degree ER and/or the uncertainty degree UC, and the sampling point recommendation information SL could be provided.

In comparison to the prediction model established using Borehole, Park91a, Park91b, EF, Alpine, the dynamic prediction model AM of the present disclosure could improve accuracy by more than 39%.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A dynamic prediction model establishment method for predicting a product process that matches an actual product quality, the dynamic prediction model establishment method comprising:

establishing an integration model by a processing device according to at least two auxiliary data sets that are provided by simulation data sets from similar machinery, wherein both of the auxiliary data sets includes an input parameter and an output response, the input parameter from both of the auxiliary data sets comprises simulation data of the product process, the output parameter from both of the auxiliary data sets comprises prediction results of the product process, and the integration model is obtained by integrating at least two individual models;

modifying the integration model as a dynamic prediction model by the processing device with a two-stage model stacking technology according to a target data set from a target system that is obtained by a data retrieval device, wherein the target data set includes the input parameter and the output response, the input parameter from the target data sets comprises sensing information or a flow of various gases of the product process, the output response from the target data sets comprises actual results of the product process, and the two-stage model stacking technology comprises:

according to the integration model, calculating a residual value between the input parameter from target data sets and the predicted output response parameter from both of the auxiliary data sets to train a residual model with one of candidate models; and selecting a suitable residual model of a plurality of the trained residual models to combine the suitable residual model and the integration model for obtaining the dynamic prediction model; and providing a sampling point recommendation information of both of the auxiliary data sets that are predicted to match the sensing information or the flow of various gases of the product process by the processing device according to an error degree or an uncertainty degree between the at least one auxiliary data set and the target data set, wherein the error degree is a difference between a distribution curve of the auxiliary data set and a distribution curve of the target data set, and the uncertainty degree is a difference between an uncertainty upper limit curve and an uncertainty lower limit curve of the distribution curve of the auxiliary data set.

2. The dynamic prediction model establishment method according to claim 1, wherein the step of establishing the integration model by the processing device comprises:

establishing the at least two individual models according to the at least two auxiliary data sets;

calculating a confidence weight of each of the at least two individual models; and integrating the at least two individual models to obtain the integration model according to the confidence weights of the at least two individual models.

3. The dynamic prediction model establishment method according to claim 2, wherein the at least two individual models are obtained according to a mean absolute error (MAE) score in a leave-one-out verification method.

4. The dynamic prediction model establishment method according to claim 2, wherein in the step of calculating the confidence weight of each of the at least two individual models, each of the at least two confidence weight is negatively correlated with a mean absolute error of each of the at least two individual models.

5. The dynamic prediction model establishment method according to claim 1, wherein in the step of modifying the integration model as the dynamic prediction model by the processing device, the dynamic prediction model is obtained through transfer learning.

6. The dynamic prediction model establishment method according to claim 1, wherein in the step of training the residual model, the residual model is obtained according to a mean absolute error (MAE) score in a leave-one-out verification method.

7. The dynamic prediction model establishment method according to claim 1, wherein the step of providing the sampling point recommendation information by the processing device comprises:

providing, in a first sampling strategy, the sampling point recommendation information according to the uncertainty degree only, wherein a lower region in the uncertainty degree is selected as the sampling point recommendation information;

providing, in a second sampling strategy, the sampling point recommendation information according to the error degree and the uncertainty degree, wherein both of the error degree and the uncertainty degree are calculated to be a sampling curve in which a lower sampling score being selected as the sampling point recommendation information; and providing, in a third sampling strategy, the sampling point recommendation information according to a sampling point distribution information, wherein the sampling point recommendation information comprises a plurality of recommended sampling points, and one of the recommended sampling points that has a large distance to another neighboring sampling point is searched from the sampling point distribution information.

8. An electric device for predicting a product process that matches an actual product quality, the electric device comprising:

a processing device configured to perform a dynamic prediction model establishment method, wherein the dynamic prediction model establishment method comprises:

establishing an integration model according to at least one auxiliary data set including an input parameter and an output response, wherein the integration model is obtained by integrating at least two individual models;

modifying the integration model as a dynamic prediction model according to a target data set including the input parameter and the output response; and providing a sampling point recommendation information according to an error degree or an uncertainty degree between the at least one auxiliary data set and the target data set, wherein the error degree is a difference between a distribution curve of the auxiliary data set and a distribution curve of the target data set, and the uncertainty degree is a difference between an uncertainty upper limit curve and an uncertainty lower limit curve of the distribution curve of the auxiliary data set, wherein the step of providing the sampling point recommendation information comprises:

providing, in a first sampling strategy, the sampling point recommendation information according to the uncertainty degree only, wherein a lower region in the uncertainty degree is selected as the sampling point recommendation information;

providing, in a second sampling strategy, the sampling point recommendation information according to the error degree and the uncertainty degree, wherein both of the error degree and the uncertainty degree are calculated to be a sampling curve in which a lower sampling score being selected as the sampling point recommendation information; and providing, in a third sampling strategy, the sampling point recommendation information according to a sampling point distribution information, wherein the sampling point recommendation information comprises a plurality of recommended sampling points, and one of the recommended sampling points that has a large distance to another neighboring sampling point is searched from the sampling point distribution information.

9. The electric device according to claim 8, wherein an amount of the at least one auxiliary data set is at least two, and the step of establishing the integration model comprises:
   establishing the at least two individual models according to the at least two auxiliary data sets;
   calculating a confidence weight of each of the at least two individual models; and
   integrating the at least two individual models to obtain the integration model according to the confidence weights of the at least two individual models.

10. The electric device according to claim 9, wherein in the step of establishing the at least two individual models, the at least two individual models are obtained according to a mean absolute error (MAE) score in a leave-one-out verification method.

11. The electric device according to claim 9, wherein in the step of calculating the confidence weight of each of the at least two individual models, each of the at least two confidence weight is negatively correlated with a mean absolute error of each of the at least two individual models.

12. The electric device according to claim 8, wherein in the step of modifying the integration model as the dynamic prediction model, the dynamic prediction model is obtained through transfer learning.

13. The electric device according to claim 8, wherein the step of modifying the integration model as the dynamic prediction model comprises:
   training a residual model according to the integration model; and
   obtaining the dynamic prediction model according to the integration model and the residual model.

14. The electric device according to claim 13, wherein in the step of training the residual model, the residual model is obtained according to a mean absolute error (MAE) score in a leave-one-out verification method.

15. The electric device according to claim 8, wherein the at least one auxiliary data set comprises a simulation data set and an approximate data set.

16. A user interface configured to display at least one auxiliary data set and a target data set, and an error degree and an uncertainty degree a dynamic prediction model, wherein the auxiliary data set includes an input parameter and an output response and the target data set includes the input parameter and the output response, the error degree is a difference between a distribution curve of the auxiliary data set and a distribution curve of the target data set, and the uncertainty degree is a difference between an uncertainty upper limit curve and an uncertainty lower limit curve of the distribution curve of the auxiliary data set, wherein the dynamic prediction model is obtained by modifying an integration model, the integration model is obtained by integrating at least two individual models, and the step of providing the sampling point recommendation information comprises:
   providing, in a first sampling strategy, the sampling point recommendation information according to the uncertainty degree only, wherein a lower region in the uncertainty degree is selected as the sampling point recommendation information;
   providing, in a second sampling strategy, the sampling point recommendation information according to the error degree and the uncertainty degree, wherein both of the error degree and the uncertainty degree are calculated to be a sampling curve in which a lower sampling score being selected as the sampling point recommendation information; and
   providing, in a third sampling strategy, the sampling point recommendation information according to a sampling point distribution information, wherein the sampling point recommendation information comprises a plurality of recommended sampling points, and one of the recommended sampling points that has a large distance to another neighboring sampling point is searched from the sampling point distribution information.

17. The user interface according to claim 16, wherein the user interface is further configured to display a plurality of sampling strategy press-keys.

* * * * *